United States Patent
Breynaert et al.

(10) Patent No.: US 11,381,305 B2
(45) Date of Patent: Jul. 5, 2022

(54) SYSTEM FOR SYNCHRONIZING A GROUND SEGMENT TO A BEAM HOPPING SATELLITE

(71) Applicant: ST ENGINEERING IDIRECT (EUROPE) CY NV, Sint-Niklaas (BE)

(72) Inventors: Dirk Breynaert, Sint-Niklaas (BE); Dimitrios Christopoulos, Antwerp (BE)

(73) Assignee: ST ENGINEERING IDIRECT (EUROPE) CY NV, Sint-Niklaas (BE)

( * ) Notice: Subject to any disclaimer, the term of this patent is extended or adjusted under 35 U.S.C. 154(b) by 0 days.

(21) Appl. No.: 16/972,209

(22) PCT Filed: May 6, 2019

(86) PCT No.: PCT/EP2019/061479
§ 371 (c)(1),
(2) Date: Dec. 4, 2020

(87) PCT Pub. No.: WO2019/233684
PCT Pub. Date: Dec. 12, 2019

(65) Prior Publication Data
US 2021/0314061 A1    Oct. 7, 2021

(30) Foreign Application Priority Data
Jun. 6, 2018   (EP) .................................. 18176340

(51) Int. Cl.
*H04B 7/204*   (2006.01)
*H04B 1/69*   (2011.01)
(Continued)

(52) U.S. Cl.
CPC ............. *H04B 7/2041* (2013.01); *H04B 1/69* (2013.01); *H04B 7/18513* (2013.01); *H04B 7/212* (2013.01); *H04B 2001/6908* (2013.01)

(58) Field of Classification Search
CPC .... H04B 7/2041; H04B 1/69; H04B 7/18513; H04B 7/212; H04B 2001/6908
See application file for complete search history.

(56) References Cited

U.S. PATENT DOCUMENTS

| 4,763,129 A | 8/1988 | Perrotta |
| 6,104,729 A | 8/2000 | Hellum et al. |

(Continued)

FOREIGN PATENT DOCUMENTS

| EP | 2549663 B1 | 6/2016 |
| WO | 2016160282 A1 | 10/2016 |

OTHER PUBLICATIONS

International Search Report and Written Opinion from PCT Application No. PCT/EP2019/061479, dated Jul. 8, 2019.
(Continued)

*Primary Examiner* — Sam K Ahn
*Assistant Examiner* — Amneet Singh
(74) *Attorney, Agent, or Firm* — Workman Nydegger

(57) ABSTRACT

A satellite communication system is arranged for consecutively illuminating a plurality of contours on earth. The satellite communication system includes a modulator adjusting its transmission of data and dummy data to detected switching time instants, without causing too long delays or buffer overflows, or without impacting a return link synchronization. Traffic can be seamlessly switched to a redundant transmitter which is aligned with the beam hopping satellite to efficiently and reliably achieve synchronization.

15 Claims, 12 Drawing Sheets

(51) Int. Cl.
    *H04B 7/185*     (2006.01)
    *H04B 7/212*     (2006.01)

(56) References Cited

U.S. PATENT DOCUMENTS

| | | |
|---|---|---|
| 6,215,442 B1 | 4/2001 | Sheynblat et al. |
| 6,295,023 B1 | 9/2001 | Bloebaum |
| 6,452,541 B1 | 9/2002 | Zhao et al. |
| 6,992,992 B1 | 1/2006 | Cooper et al. |
| 7,660,377 B2 | 2/2010 | Meyer |
| 2001/0039192 A1 | 11/2001 | Osterling et al. |
| 2016/0204854 A1 | 7/2016 | Miller et al. |
| 2017/0104520 A1* | 4/2017 | Rainish ............... H04W 28/065 |
| 2017/0288769 A1* | 10/2017 | Miller ............... H04B 7/18515 |
| 2017/0289822 A1 | 10/2017 | Hreha et al. |
| 2018/0006370 A1* | 1/2018 | Hreha ............... H04W 56/0015 |

OTHER PUBLICATIONS

Extended European Search Report from corresponding EP Application No. EP18176340.0, dated Nov. 7, 2018.

\* cited by examiner

Example of Satellite position estimation assuming Cartesian Coordinate system

| | X [m] | Y [m] | Z [m] | INPUT Delta Delay [s] $\delta$ | | Estimated Distance [m] | | Delta Distance [m] DL | |
|---|---|---|---|---|---|---|---|---|---|
| GW 1 | 0 | 0 | 0 | 0 | T_2 - T_1 | 0.001650913 | GW.1 - SAT | 36000002.78 | GW.2 - GW.1 | 494931.1172 |
| GW 2 | 6000000 | 0 | 0 | 0 | T_3 - T_1 | 0.003687635 | GW.2 - SAT | 36494933.89 | GW.3 - GW.1 | 1105525.112 |
| GW 3 | 0 | 0 | 9000000 | 0.000000 | T_3 - T_2 | 0.002036722 | GW.3 - SAT | 37105527.89 | GW.3 - GW.2 | 610593.9951 |
| GW 4 | 0 | 0 | 12000000 | 0.000000 | T_4 - T_1 | 0.006485051 | GW.4 - SAT | 37944172.15 | GW.4 - GW.1 | 1944169.37 |
| Calculated SAT position | 9999.999978 | 36000000 | 9999.999999 | | | | | | | |
| Actual SAT position | 10000 | 36000000 | 10000 | | | | | | | |
| Solution Error [m] | -0.000022 | -0.000003 | -0.000001 | | | | | | | |
| Sol. Error [nsec] | -0.000073 | -0.000011 | -0.000005 | | | | | | | |

Fig. 10

SYSTEM FOR SYNCHRONIZING A GROUND SEGMENT TO A BEAM HOPPING SATELLITE

FIELD OF THE INVENTION

The present invention is generally related to the field of satellite communication systems.

BACKGROUND OF THE INVENTION

In communication networks traffic (for instance Internet traffic) is always directed to where it is needed. Static communication satellite payloads achieve this by constantly illuminating the coverage area, even at times when less communication traffic is requested, thereby not efficiently exploiting the available physical resources. Instead, beam hopping offers the flexibility to dynamically redirect during operation payload resources (i.e. power, frequency, time) to the geographic locations, where receivers are requesting communication traffic at a certain moment in time. Beam hopping in satellite communications aims to increase the flexibility to direct communication traffic to the receivers (i.e. to the contours on earth where the receivers are located) where needed. Multiple beam hoppers can be present in a beam hopping satellite. A single beam hopper in a beam hopping satellite illuminates multiple contours on earth one after another. For example, assume there are three contours C1, C2 and C3. Then a possible sequence of illumination is e.g. C1 C1 C2 C3 C2 C1 C3 C3 C1 C2. The sequence is periodically repeated. In this example, receivers in contour C1 get access to more satellite resources than those in contours C2 or C3. This way, flexible satellite resource allocation to contours is possible, which opens a whole range of market opportunities (e.g. sending more traffic to hot spots). The plan describing the sequence C1 C1 C2 C3 C2 C1 C3 C3 C1 C2 is called the hopping plan. Referring to FIG. 3 and FIG. 11 the following parameters of a beam hopping system are defined. The time instant at which this plan's execution by the beam hopping satellite starts, is the StartofHoppingPlan (SouP), denoted t_0. The minimum time duration that a contour is being illuminated, is called a hopping slot. A contour can be illuminated for any time duration equal to an integer multiple of the hopping slot. The time instant at which the satellite steers the beam from one contour to another contour is called the switching time instant. Hence, the first switching time instant equals t_0+ m*hopping slot, wherein m denotes an integer number. The hopping plan can be dynamic, i.e., it can be changed by the satellite operator to adjust to new traffic needs of the customers. The time duration of the transmission to the sequence of contours corresponding to a particular hopping plan is referred to as the hopping period.

Starting at SoHP, the hopping plan is executed until a new hopping plan is received. More specifically, the time instant SoHP(n) is defined as the SoHP for the $n^{th}$ hopping plan, from which the start of the $k^{th}$ repetition of that $n^{th}$ hopping plan, SoHP(n,k), can be computed as SoHP(n,k)=SoHP(n)+ k*HP(n)=SoHP(n)+k*HP, where HP denotes the duration of the $n^{th}$ hopping plan. For simplicity of notation but without loss of generality, the index n is dropped from HP(n), implying a fixed HP (as defined by the satellite communications payload).

Typical order of magnitudes of the parameters applicable to this problem are provided to get a grip on the complexity of the problem. A typical carrier symbol rate is 500 Mbaud, which corresponds to a symbol time of 0.002 µs or 2 ns. A DVB-S2X (super)frame (as defined in ETSI EN 302307-2: "Digital Video Broadcasting (DVB); Second generation framing structure, channel coding and modulation systems for Broadcasting, Interactive Services, News Gathering and other broadband satellite applications; Part II (DVB-S2X)") has a length in the order of 20000 (600 000) symbols, resulting in a frame duration of around 40 µs (1.2 ms). A hopping period is around 250 ms. The time duration of a beam switching (more specifically, the dwell rise and fall time) is around 200 ns, so for a 500 Mbaud carrier the switching takes around 100 symbols. GPS time precision is around 100 ns.

To ensure an uninterrupted service, the transmitter on the ground (or in general, the ground segment, which may comprise multiple transmitters) needs to properly time align the transmitted signal corresponding to a particular contour with the illumination of that contour by the beam hopping satellite. For example, the transmitted signal corresponding to contour C2 needs to arrive at the satellite during the time the satellite is illuminating contour C2.

Satellites are considered here wherein the communication payload is not able to delay the received signal in a flexible way to the contours (as is possible e.g. when using digital satellites sampling and buffering the received signal). Hence, the satellites considered in this disclosure are not able to make sure that the signal sent downlink towards a particular contour is aligned with the beam switching times before and after the illumination of that contour.

Summarizing, one can state that the satellite switching the one or more beams over the contours, is the master of the time dimension and the one or more transmitters of the ground segment must adapt to that.

A beam hopping satellite is typically adopted for data communication. A typical realization is based on a star network in which a transmitter at the gateway transmits in the so-called forward (FWD) link over the satellite to multiple terminals. In the case of interactive communication the terminals transmit back in the so-called return (RTN) link over the satellite towards a receiver at the gateway. If needed (e.g. if the bandwidth needed in the forward link is larger than the bandwidth that can be transmitted from a single transmitter) more transmitters and/or receivers are used at the gateway. In addition, a gateway can suddenly drop its transmission due to some failure (e.g. an electronic failure or a severe rain cloud blocking the transmission from one gateway transmitter to the satellite). In such case a redundant or additional gateway is activated to take over its transmission such that users do not (or hardly) see an outage. The other or redundant gateways are not necessarily collocated with the first gateway.

FIG. 1A provides an illustration. A single central controller is placed in one of the possibly multiple (up to N) gateway locations. Note that it could also be placed elsewhere, the location of the central controller is not important as long as it is connected via a communication link to each of the gateways. In each location at least one rack with de/modulator devices and a blade server is connected through a coaxial interface to the RF equipment (i.e., comprising upconverter, high power amplifier, antenna etc.), respectively. Each gateway site is wirelessly connected to the beam hopping satellite with typically a different uplink delay, due to different propagation paths. The beam hopping satellite downlinks the signal to one or more locations, namely contours, not all simultaneously active. In some of the contours reference terminals, one per gateway, are set up connected to the central controller via terrestrial and possibly also via satellite RTN link.

The transmitter that must adapt to the beam hopping satellite can be either the gateway transmitter in the forward link or the terminal transmitter in the return link. In the former case the gateway transmitter must align the transmission for a particular contour with the illumination of that contour. In the latter case the terminal transmitter in a contour must align its transmission such that it arrives at the satellite at the moment this satellite illuminates said contour. A satellite can be a beam hopping satellite in the forward link and a normal satellite in the return link, or vice versa. Beam hopping can also occur in both forward and return link. In the rest of this description, it is assumed that both the return and forward link are hopping links for the ease of understanding, but the invention is also applicable if only the forward link is hopping.

In the forward link of a star network (wherein few gateway transmitters transmit to typically many terminals) the data or traffic for a given terminal, which is located in a given contour, is output from a processor (e.g. a processor on a server) towards the modulator, typically over an Ethernet cable. The data stream is a serial multiplexing of data for many terminals, considering for example the amount of traffic needed by all terminals, their specific rate plan, fairness etcetera. Inside the modulator, also dummy data (e.g. data generated from a Pseudo-Random Binary Sequence (PRBS) generator, which is sufficiently random in order not to harm the signal spectrum; this data will not be decoded by any terminal) is multiplexed with the data stream to fill the carrier (i.e., in order to avoid overflow of queues, the data rate is slightly smaller than the symbol rate, with the consequence that from time to time dummy data must be sent to achieve a given symbol rate, see for example the insertion of dummy frames in ETSI EN 302307-1: "Digital Video Broadcasting (DVB); Second generation framing structure, channel coding and modulation systems for Broadcasting, Interactive Services, News Gathering and other broadband satellite applications; Part I (DVB-S2)", Sec 5.5.1). The modulator itself is a part of the physical layer of this network and is thus in general not aware of which bits are to be sent to which contour. It just receives bit sequences (e.g. DVB-S2 baseband frames) which it encodes, maps to symbols and pulse-shapes to a waveform which is modulated onto a carrier frequency. The modulation means comprising a transmit filter or pulse shaper requests symbols at the symbol rate. If no frame is available (because the data rate is slightly smaller than the symbol rate), dummy data (e.g. a frame of dummy symbols provided by the physical layer signalling in the case of DVB-S2, or dummy symbols or dummy frames of any type in the case of a DVB-S2X super frame) is provided to the pulse shaper.

In the return link of a star network (whereby many terminal transmitters transmit to few gateway receivers) the terminals share the satellite resources, meaning that the terminals must be organized to transmit orthogonal signals (not interfering in time or frequency). This is typically achieved by slaving the terminals to a common gateway reference, such as the network clock reference (NCR). The NCR is a counter increasing at an internal clock rate that can be synchronized with GPS time, cf. DVB-S2 Annex G.5. A common time reference for all the terminals is offered by including periodically the current value of the NCR in the forward transmission signal. A placeholder for this counter value is already reserved in the bit sequences sent from the processor (e.g. in a server), but the final content inserted in that placeholder is restamped by the modulator at a time instant when the transmission time between subsequent symbols cannot change anymore (e.g. due to buffering). This is typically right before the mapped symbols get processed by the transmit filter of said modulator. By including such NCR, all terminals know "what time it is" according to the same clock and thus all terminals can transmit in distinct time slots and frequency bands. The information when and how long each terminal must transmit it also passed from the hub to the terminals through the forward link.

In case the traffic in the forward link is routed to a redundant gateway transmitter (e.g. due to a rain cloud), the path delay of a packet may increase (e.g. because transmitters are not collocated or because the traffic first must travel on a fibre from the first to the redundant gateway) and, as such, the NCR at the terminals is not stable (i.e., the difference between the NCR values of two different consecutive frames may be longer than the frame duration, referred to as an NCR jump in the following). Nowadays, terminals typically go out of lock upon an NCR jump or they catch the sudden change in the NCR and send out packets earlier with the same change, such that the packets still arrive at the same time at the hub demodulator. In the case of beam hopping in the return link, such earlier sending of the return link packets would cause a time-misalignment of the packets with the beam hopping satellite, which is of course not allowed.

A continuous transmit signal from the gateway modulator is necessary because, in the forward link, the satellite is in automatic level control (ALC) mode, which is scaling the input signal to maintain a constant power towards the satellite amplifier. In this operational mode it is not allowed that the input signal to the satellite be dropped, which explains why it is required to "fill" the forward carrier with dummy data as mentioned above.

Multiple gateway transmitters (e.g. additional or redundant gateway transmitters) are not always collocated, hence the transmission delays between the one or more transmitters and the satellite are different. Furthermore, as the satellite is moving, the transmission delays are constantly changing. The same holds for the return link where the terminal transmitters themselves can be mobile as well.

Hence, the main challenge of communicating over a beam hopping satellite in a network can be seen as how to find a mechanism for any transmitter to know at which time instant it must transmit a frame such that it is amplified by the satellite in the correct hopping slot. This is complicated amongst other things by the following constraints The gateway transmitter must operate continuously without interrupting the signal as the forward link is in an Automatic Level Control (ALC) mode, to compensate for possible uplink fades.

The modulators themselves are part of the physical layer and typically not aware of contours. In addition, the modulators themselves add from time to time dummy data which delays data frames, possibly causing a misalignment with the beam hopping satellite.

The gateway transmitter is not the master anymore of the timing as it must adapt to the hopping satellite. However, its master role is required to organize the return link transmissions from the terminals in star networks. A solution must be found for this problem.

In addition, in a beam hopping return link terminals must not only transmit orthogonally, but also in the correct time window such that their transmission reaches the satellite at the time instant when the satellite illuminates their contour, which calls for adaptations of the current return link organization. For example, the NCR must remain stable, also in the case of a hub failure and replacement by a redundant hub or in the case of hub switching.

These constraints make the design of ground segment synchronization to a beam hopping satellite a very complex problem, which is unsolved in the prior art.

The concept of a satellite steering in time the transmit power over multiple contours is generally known as satellite switched TDMA. However, documents like U.S. Pat. Nos. 4,763,129 and 6,992,992 only consider regenerative satellites, i.e., with on board processors that demodulate the received signal and re-modulate it before sending it to the terminals. This way, the master satellite slaves the downlink transmission to its own clock and properly transmits the data to the respective contours at the correct time. EP2549663B1 includes an on-board packet scheduler receiving traffic destined to specific beams from a ground station and schedules the packets in downlink queues. The goal there is to achieve maximum efficiency in finding compatible packets (i.e. reduce tiling loss) while providing a means to achieve statistically weighted fairness in scheduling packets for destination cells.

Considering the general satellite and ground segment clock synchronization prior art, various solutions have been proposed for time synchronization and clock drift management such as in U.S. Pat. Nos. 6,452,541, 6,104,729, 6,295,023, US2001/039192, U.S. Pat. No. 6,215,442, WO2016/160282 and U.S. Pat. No. 7,660,377. In those documents it is assumed that the hopping transmitter (i.e. the satellite in this case) can modify the downlink signal and thus signal the timing information to the ground. Further, it is not explained how the return link organization is adapted to beam hopping, how the transmitters adjust their signal to adapt to the inferred timing information, etc. WO2016/160282 proposes to manage the clock drift rather than to correct it, by modifying the guard times to handle the clock drifts. This is expected to lead to high efficiency losses in beam hopping systems.

In US2016/204854 a full beam hopping system including a bent pipe analog payload and ground segment is described. A specific sequence of contours is proposed with 16 Hopping Slots of 1.5 msec each resulting in a 24 msec time period. The document provides a discussion on how to choose the right sequence of contours to minimize delay jitter. US2016/204854, however, does not specify how the transmitter determines the time instant at which it must transmit samples corresponding to a given contour to the satellite or how to organize the return link.

In the papers "*Challenges of a flexible satellite payload on the payload and operational software tools*" (S. Amos et al., 3rd ESA Workshop on Advanced Flexible Telecom Payloads. March 2016, ESA/ESTEC, Noordwijk (NL)) and "*Eutelsat QUANTUM-class satellite: beam hopping*" (E. Feltrin et al., 3rd ESA Workshop on Advanced Flexible Telecom Payloads, March 2016, ESA/ESTEC, Noordwijk (NL)), a constraint is imposed on the downlink user beam which must be received by a receiver at the gateway. If the gateway is not in the contour of the remote terminals, this is solved by creating a "secondary" beam by splitting one of the downlinks and redirecting it to the gateway position. In the case of the Quantum satellite, this can be achieved since a beam can be flexibly directed through beamforming, even though some satellite resources (e.g. bandwidth and antennas) are sacrificed. This overhead is further increased in the case of using multiple gateways, for example to seamlessly switch in the case of fading. A detector, collocated with the gateway transmitter, consequently estimates the time drift by receiving the downlink signal. However, it is not mentioned how the detector passes the switching time to the modulator and how the modulator adjusts its transmission to that. It is also not explained how that transmission adjustment avoids overflows of buffers or a too large delay of packets, for example. Finally, it is not specified how the return link synchronization based on the NCR is maintained, also in the case of return link beam hopping. It is also to be noted that the creation of a specific secondary beam is not possible for every satellite.

In none of the above-mentioned prior art documents it is specified how to prevent a misalignment of the transmitter and the beam hopping satellite caused by the required inclusion of dummy data in the transmit stream.

Hence, there is a need for a satellite communication system for data traffic with appropriate alignment of the transmitter and the beam hopping satellite so that the throughput over the beam hopping satellite is maximized.

SUMMARY OF THE INVENTION

It is an object of embodiments of the present invention to provide for satellite communication system wherein a proper time alignment is achieved between the transmitter and the beam hopping satellite.

The above objective is accomplished by the solution according to the present invention.

In a first aspect the invention relates to a satellite communication system arranged for consecutively illuminating a plurality of contours on earth and comprising:
  a transmitter device arranged for generating a signal to be transmitted and comprising
    one or more hopping framers each arranged for receiving a sequence of bits and for organizing the sequence into a hopping frame according to a hopping plan indicating an order in which the plurality of contours is to be illuminated,
    encoding means per hopping framer for mapping the hopping frame to a sequence of digital symbols,
    modulation means per hopping framer arranged for receiving the sequence of digital symbols and for modulating the digital symbols on a waveform at a symbol rate, thereby obtaining a modulated signal to be transmitted, and for initiating transmission of the modulated signal at a time instant equal to a Start of Hopping Frame, SoHF, time instant, said modulation means being arranged for indicating to the hopping framer when a next hopping frame is needed, whereby the hopping framer is arranged for inserting dummy data if not sufficient bits are available in the sequence of bits when the next hopping frame is needed,
  a satellite comprising a beam hopping transponder arranged for receiving the modulated signal and for outputting a version of said modulated signal to an illumination circuit arranged in said satellite for steering illumination from one contour to another contour according to said hopping plan, said illumination of said one contour starting at a switching time instant,
  one or more receiver devices in said particular contour of the plurality of contours to be illuminated and arranged for receiving the output signal,
  a central controller having an established communication link with at least one of said receiver devices and arranged for receiving via an established link information on observed illumination transitions, said central controller comprising computation means for computing updated timing information for aligning in time the transmitter device and the beam hopping transponder, based on the information on observed illumination transitions and being in connection with the transmitter device for passing the updated timing information to the transmitter device.

The proposed solution indeed allows for accurately determining the Start of Hopping Frame transmit times in the ground segment of the satellite communication system in order to optimize the throughput over the beam hopping satellite. By providing the one or more hopping framers it is possible to have an encoder and modulator per hopping framer. The modulator can then indicate to its corresponding hopping framer, through the encoder, when a next hopping frame is needed. In case an insufficient number of bits is available at the input of the hopping framer for completing a next hopping frame, the hopping framer inserts an amount of dummy data as needed. Note that the satellite outputs a version of the modulated signal that may have undergone one or more operations like an amplification, frequency conversion, filtering, . . . .

In a preferred embodiment the computation means of the central controller is arranged for computing an adjusted symbol rate for the transmitter device based on a comparison of the observed illumination transitions with a desired version of the switching time instant.

The computation means of the central controller is advantageously arranged for computing an estimate of the SoHF.

In one embodiment the SoHF is set to a value equal to the switching time instant minus a transmission delay between the transmitter device and the satellite comprising the beam hopping transponder.

In other embodiments the computation means is arranged for determining an adjusted symbol rate based on the updated timing information.

In one embodiment the SoHF is expressed in terms of a value of a network clock reference.

In a preferred embodiment the satellite communication system is arranged to compare the SoHF with a target value and to adjust the symbol rate based on said comparing.

In one embodiment the transmitter device is arranged to drop one or more symbols before adjusting the symbol rate.

In another advantageous embodiment the satellite communication system comprises
- at least four transmitter devices with known position and arranged for transmitting to the satellite comprising the beam hopping transponder, and
- at least four receiver devices, each of the receivers being connected to a corresponding transmitter device of the at least four transmitter devices and each having a communication link to the central controller.

The central controller is then preferably arranged for computing a SoHF for each of the at least four transmitter devices.

In certain embodiments the system comprises an additional transmitter device with known position arranged for receiving a different SoHF time instant determined based on the satellite's position and switching time instant obtained using the at least four transmitter devices.

In other preferred embodiments the satellite communication system is arranged for use in transmission over a link from one of the receiver devices over the satellite towards the transmitter device. That one receiver device is arranged for symbol rate adjustment based on signalling from the transmitter device towards the one receiver device.

In a preferred embodiment the signalling is based on comparing a receive time of a transmission of said one receiver device with a target receive time.

In certain embodiments the receive time is a receive time of a first symbol of a frame in said transmission and wherein said target receive time is a SoHF time instant incremented with two times said transmission delay between said transmitter device and said satellite comprising said beam hopping transponder.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

FIG. 10 illustrates the results of the satellite position estimation algorithm for the synchronization to the beam hopping satellite.

DETAILED DESCRIPTION OF ILLUSTRATIVE EMBODIMENTS

Figure 1A:
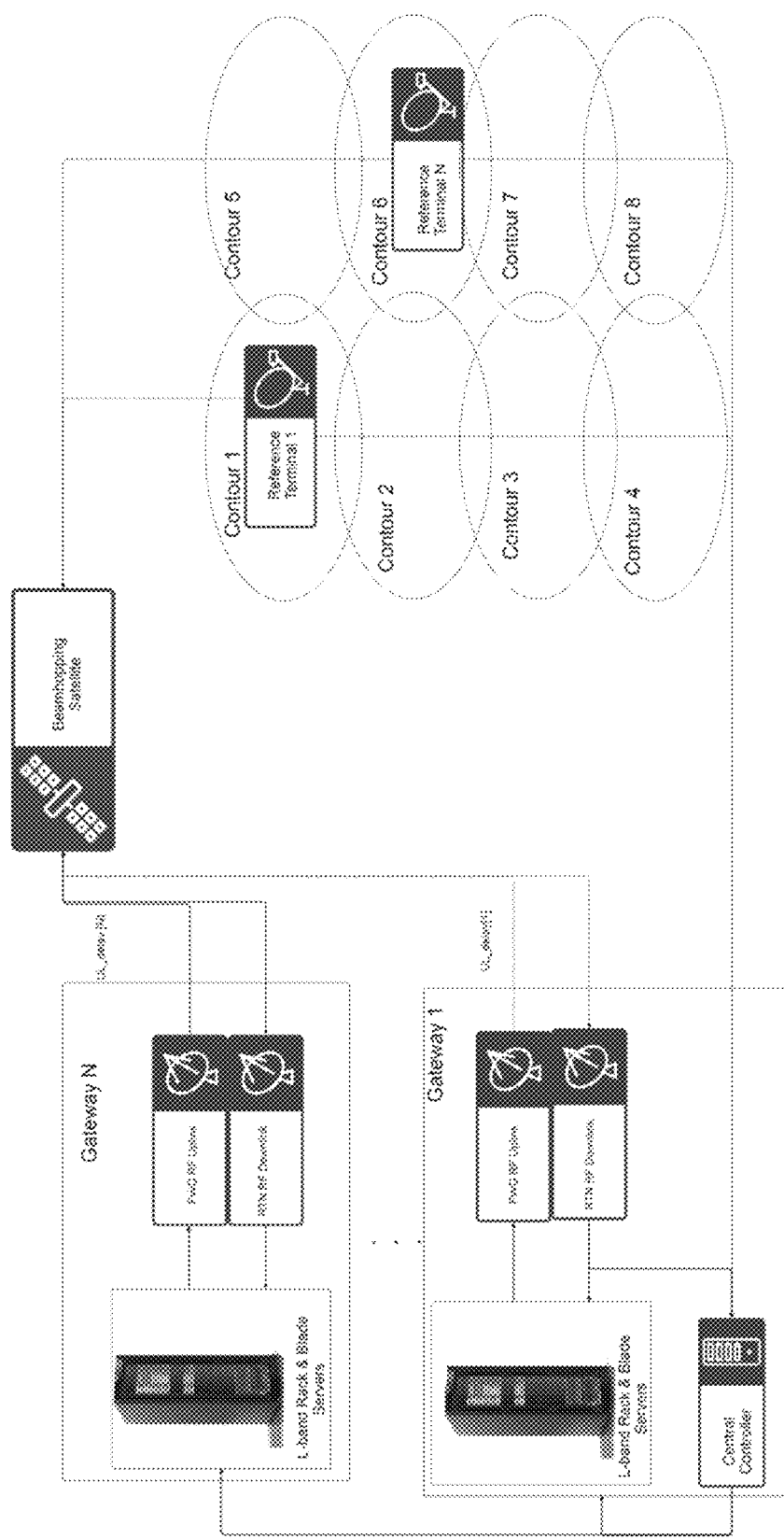
FIG. 1A presents a high-level overview of the main components comprised in a beam hopping system.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention aims to present a satellite communication system that does not require reference terminals to be collocated with the gateway transmitters. It further discloses in detail how the modulator adjusts its transmission of data and dummy data to the detected switching time instants, without causing too long delays or buffer overflows, or without impacting the return link synchronization. It is explained how the traffic can be seamlessly switched to a redundant transmitter which is immediately aligned with the beam hopping satellite. The means for efficiently and reliably achieving this synchronization are provided in the present disclosure.

In the present invention it is assumed that the payload cannot variably delay or modify the received signal, except for the steering of the beam over different contours. Hence, besides from the beam hopping, the on-board group delay of the signal is static.

A blade server is a stripped-down server computer with a modular design optimized to minimize the use of physical space and energy. The terminals to which the traffic can potentially be combined in a single frame (these terminals decode the same carrier at the same time in the same contour) are grouped in a satellite network or satnet. A satnet processor (e.g. a central processing unit (CPU) processor on a blade server) is responsible for handling forward and return (also referred to as inbound and outbound) traffic associated to a satnet.

A satellite communication system is considered wherein in the forward link a satnet processor (e.g. a processor on a server) multiplexes data (also referred to as traffic) to a group of terminals in a frame which is then sent to the modulator (e.g. over an Ethernet cable). Such a frame is for example a baseband frame but it can also be another type of frame. The speed or rate at which said frame is sent to the modulator, depends on the average rate at which data for this satnet is transmitted over the air (typically equal to the symbol rate of the transmitted carrier, or a fraction of that in the case of time slicing, see DVB-S2 Annex M). In the following, reference is made to the symbol rate of the transmitted carrier, but this invention is also applicable to time slicing or another sharing mechanism of a carrier over satnets. The data in the frame from the processor is provided at a rate that is slightly less than the carrier symbol rate to avoid buffer overflows in the modulator, as closed control loop of the modulator implemented in HW, while the satnet processor with a bursty output is implemented in software, is challenging. In other words, backpressure from the modulator to the satnet processor or server, which works in a different clock domain than the modulator and could be connected over an Ethernet cable for example, is not straightforward. In the state of the art the absolute time instant at which packets are sent from the satnet shaper to the modulator, is not important as long as the rate at which packets are sent, satisfies the above constraint, i.e. to be lower than the modulator symbol rate (e.g. reduced by 0.1%). Data for multiple satellite networks can be transmitted over the air from a single modulator either in a serial way (e.g. via time slicing in a large physical carrier, cfr. DVB-S2 Annex M) or in a parallel way (e.g. by transmitting multiple carriers over orthogonal frequencies; those multiple carriers can be present in a single beam or contour illumination). Hence, the satnet processor or multiple satnet processors send multiple data streams, belonging to multiple satellite networks, to the modulator. These frames are then buffered in storage means in the modulator (e.g. in the case of time slicing, to guarantee a minimum time between frames from the same slice number), for example on a field programmable gate array (FPGA) or an application-specific integrated circuit (ASIC or chip). Subsequently each frame is encoded by the modulator to forward error corrected (FEC) frame, mapped to a physical layer frame of symbols and pulse shaped to a baseband waveform. This baseband waveform is finally upconverted onto a carrier frequency by an IQ modulator. Before performing the pulse shaping, the gateway transmitter restamps the placeholder for the network clock reference (NCR) with the actual value of a reference clock in the modulator, such that all terminals can slave to this common value, which allows them to synchronize their return link transmissions. The modulator is configured (e.g. the symbol rate) by a local modulator processor.

Figure 3:
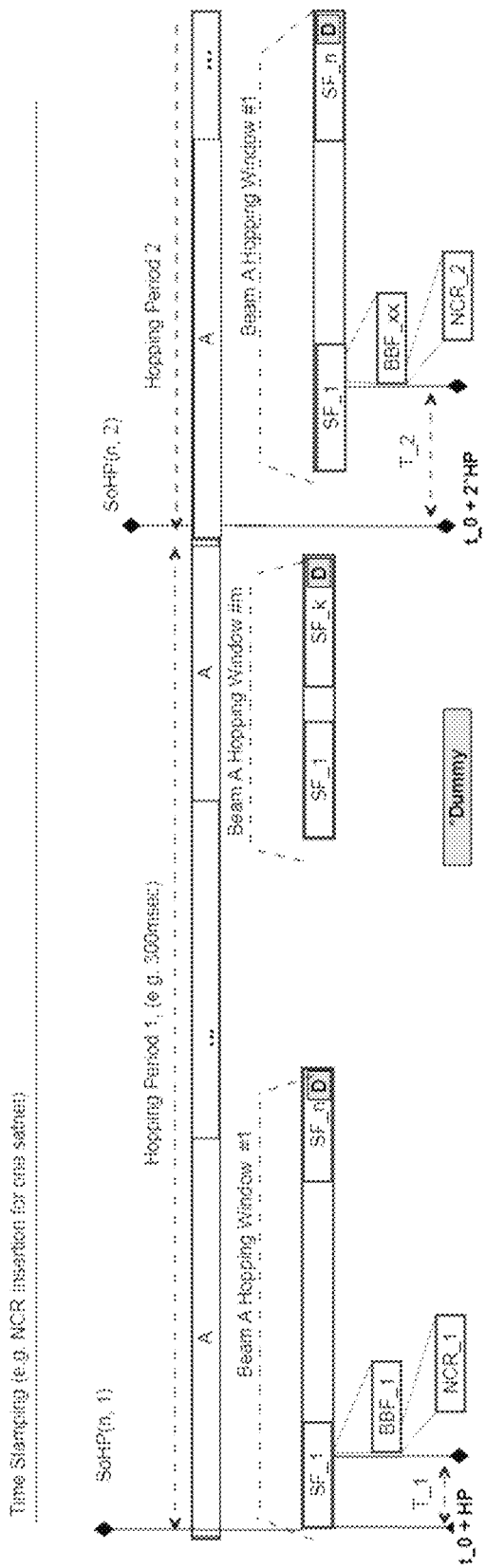
FIG. 3 illustrates an example of timestamping for one satnet, over two instances of the hopping period of an $n^{th}$ hopping plan.

FIG. 3 presents an example of timestamping for one satnet, over two instances of the hopping period. The NCR is typically at the beginning of the baseband frame (BBF) being carried. This frame can be at any place of the first hopping frame and it could reappear in the subsequent instance of the hopping period. More often NCR insertion can also be implemented depending on the system requirements.

In embodiments of the satellite communication system according to the invention a transmitter device for transmission in the forward link over a beam hopping satellite includes a block at the modulator input, that is aware of the hopping plan of that satellite. This block is called a hopping framer and multiplexes frames received from the satnet processor in a hopping frame. One or multiple hopping framers, with the associated modulation and encoding means and the dedicated on board physical layer resources constitute a single hopper, as illustrated in FIGS. 1B and 1C.

For example, suppose that a single carrier of 100 Mbaud is transmitted consecutively in time over the contours C1 C1 C2 C3 C2 C1 C3 C3 C1 C2. Hence, there are 10 hopping slots, in which C1, C2 and C3 are illuminated 4 times, 3 times and 3 times, respectively. The satellite networks 1, 2 and 3 are each shaped to the "inferred virtual symbol rates" of 4/10*100, 3/10*100 and 3/10*100 Mbaud, respectively, by the satnet processors. The resulting data streams are sent to the modulator (either via multiple input ports or, in a multiplexed way, to a single input port). Subsequently, the hopping framer orders the frames from the beam hopping satellite to adhere to the hopping plan. Hence, a hopping framer per satellite hopper (or per beam) is needed.

The frames sent by the modulator can be of various types, including normal DVB-S2 or DVB-S2X frames or DVB-S2X superframes (cfr. DVB-S2X Annex E). To avoid data loss during the beam switching from one contour to another, a sequence of dummy data is included at the end of at least the last frame sent in a hopping slot. This may be a standard DVB-S2(X) dummy frame with 3330 dummy symbols. In DVB-S2X superframes it is allowed in some formats (e.g. in format 4) to include a number of dummy symbols inside a normal frame, said number being an integer multiple of 90. Other types of dummy data can also be used. The ultimate goal of synchronizing the transmitter with the beam hopping satellite is to include a guard time equal to the beam switching time duration. The guard time in practice includes an added margin to account for synchronization errors.

The satellite communication system of the invention further comprises a single central controller and a terminal per gateway in at least one of the illuminated contours, whereby at least one terminal per gateway has an established communication link towards the central controller. The established and operational communication link can be over satellite of via a terrestrial link.

Figure 1B:
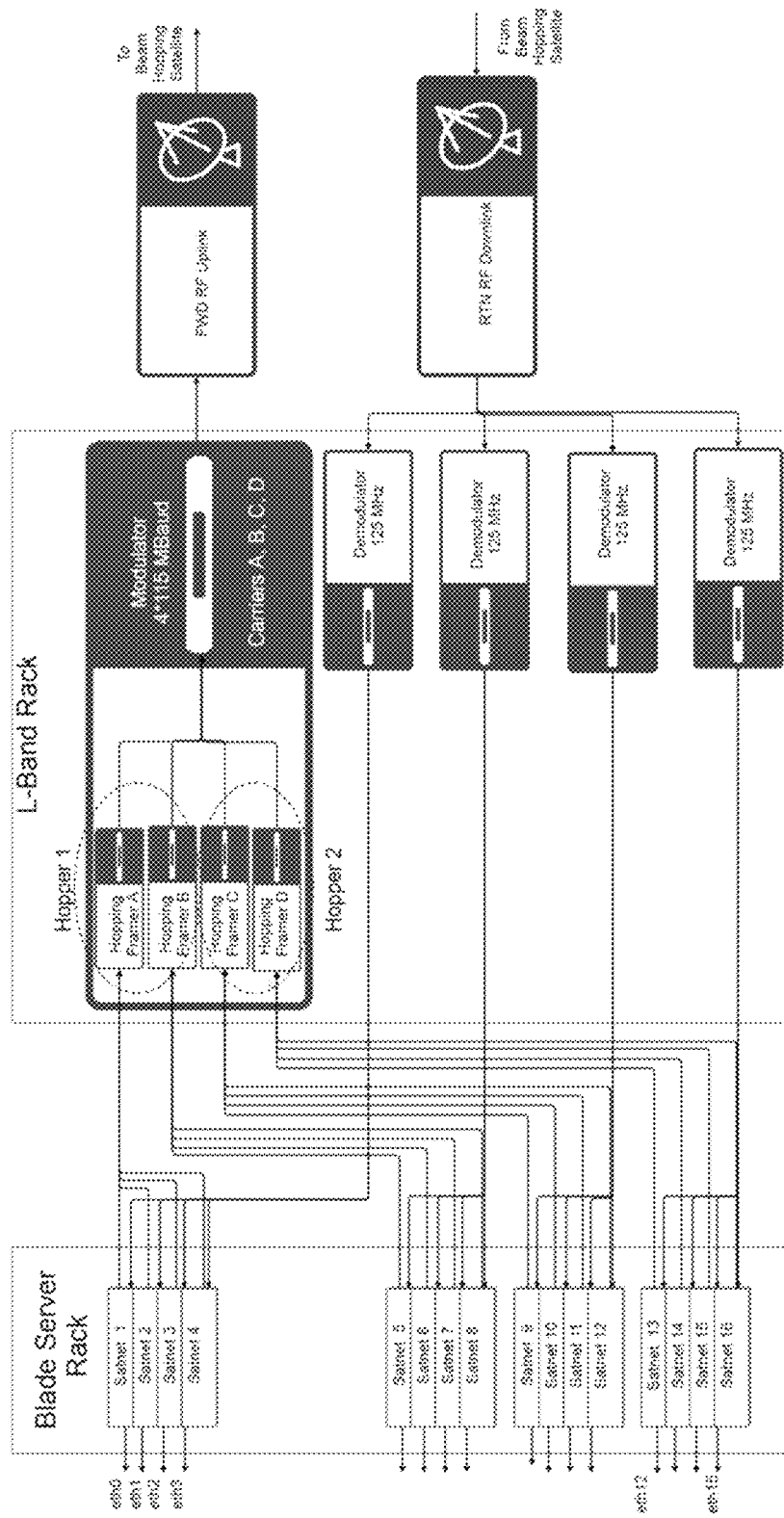
FIG. 1B shows details of a beam hopping L-band rack.
Figure 1C:
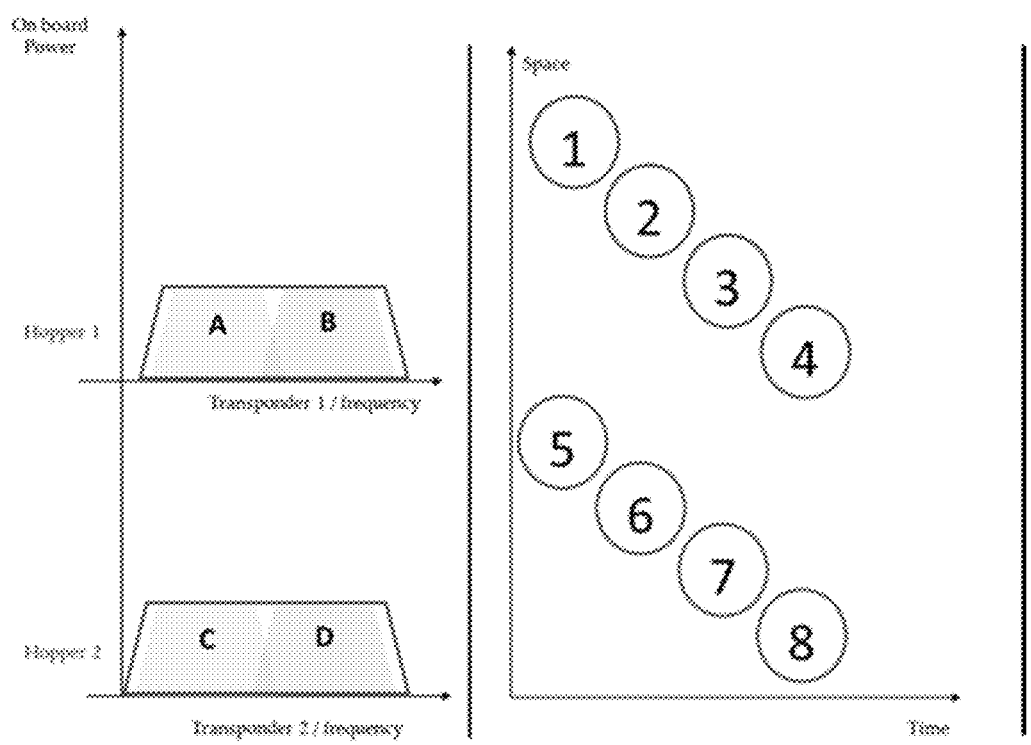
FIG. 1C illustrates two separate hoppers on the vertical axis and per hopper two carriers multiplexed in the time, frequency and spatial domains.

An exemplary hub architecture for a beam hopping satellite with two beam hoppers each arranged for 250 MHz bandwidth hopping over 8 forward (FWD) and 8 return (RTN) contours, is depicted in FIG. 1. In more detail, in FIG. 1A each depicted contour represents one FWD and one RTN contour. Multiple (up to N) gateways uplink signals to the beam hopping satellite, each with a separate uplink delay UL_delay[n] with n=1, ..., N. Then these signals are downlinked to the set of contours 1-8. In the presented example FWD and RTN contours 1-4 belong to beam hopper 1 and contours 5-8 to beam hopper 2. There is a reference terminal per gateway, with terrestrial and optionally also satellite return connectivity to the central controller. The central controller has connectivity to all the gateways, e.g. via Ethernet or fibre cables. Next, in FIG. 1B details on the L-band and server racks are given. Waveguides (e.g. coaxial cables for L-band interfaces) connect the RF equipment to the (de)modulators in the rack. Multiple hopping framers, one per carrier, are implemented internally in the modulator. These framers are connected to the blade servers which handle encapsulation and traffic shaping before transmitting over, for example, Ethernet interfaces. In FIG. 1B the concept of a satnet is also shown, which is a set of terminals and their associated traffic, which belong to one contour and one carrier. Multiple satnets are multiplexed per framer. In turn, each satnet is connected to the incoming traffic from the customer network via an Ethernet interface. Multiple satnets can belong to the same contour, e.g. through different carriers. FIG. 1C shows the frequency and time domains in the left and right hand horizontal axes (i.e. x axis), respectively. On the left side the vertical axis (i.e. y-axis) illustrates the two separate hoppers, associated with two separate transponders (i.e., electronics on-board the satellite filtering and amplifying a part of the frequency spectrum). Per transponder (i.e. per hopper) two carriers and therefore two satnets, are multiplexed in the frequency domain. On the right hand side the spatial domain is plotted in the x-axis. There, the set of contours associated with the each of the hoppers is illustrated. In different time instants different pairs of contours are simultaneously illuminated. Each contour has a distinct position on the ground. Identical resources (i.e. transponders, frequency, time, position on ground) are separated to reduce interference. For instance, in FIGS. 1B and 1C, satnets 1-4 are provisioned in carrier A and framed by beam hopping (BH) framer A. Next, satnets 5-8 are provisioned in carrier B and framed by BH framer B and so on. Carriers A and B, along with BH framers A and B belong to hopper 1 and synchronously hop over contours 1-4 in time. Satnets 1 and 5 belong in contour 1, satnets 2 and 6 belong in contour 2 and so forth, until satnets 12 and 16, which belong in contour 8, provisioned in carrier D and hop in hopper 2. Finally, FIG. 1C illustrates the frequency, time and on-board power) resource allocation. Carriers A and B are sent at the same time to the same contour, so interference is minimized by transmission in non-overlapping frequency bandwidths. Carriers A and C (as well as B and D) occupy the same frequency bandwidth so interference is minimized by transmission to different contours and/or in different time slots. Contours 1 and 5 can be simultaneously illuminated by carriers A and C because these contours are sufficiently separated in space. The calculation of the hopping plan might target for instance to prevent the simultaneous illumination of beam 4 and 5 in order to avoid interference between the co-channel carriers (A-C and B-D).

Figure 2:
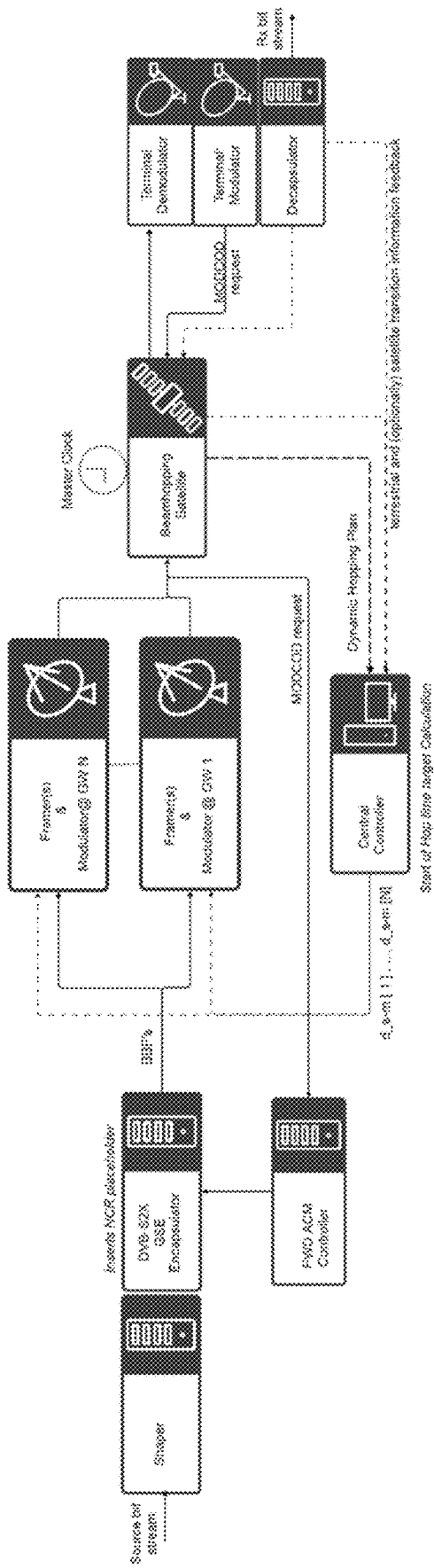
FIG. 2 illustrates a block diagram of the communication chain of a single satnet over the beam hopping satellite.

In FIG. 2 a block diagram illustrates the communication chain of the beam hopping ground segment from the shaper up to the decapsulator of a terminal. Starting from the source bit stream, it continues to conventional non-beam hopping related encapsulation and shaping to DVB-S2X baseband frames (BBFs), also enabled for automatic coding and modulation (ACM) via the ACM controller, and then encoding and modulating to beam hopping specific waveforms (e.g. superframes or DVB-S2X frames mapped onto a waveform inside the modulator), RF uplinking to the beam hopping satellite, reception at the reference terminal, decapsulation and the feedback towards the central controller. The controller also receives the hopping plan from the satellite operator and is responsible for the synchronization of all modulators to this plan.

In more detail, the central controller performs a central role in the synchronization. The central controller (CC) coordinates all blocks in the first and additional gateway transmitters for the exact time alignment of the transmitted signal in the forward link to the switching time instants at the beam hopping satellite. Amongst other things, in a preferred embodiment, the CC is primarily responsible for the SoHF time instant estimation.

A switching time instant is a moment in time with infinitesimal accuracy at which the switching event for one contour to go from active to inactive and a next contour to transition from inactive to active is defined. In reality the switching event lasts a non-infinitesimal time duration, which is defined as the beam switching time duration.

The switching time instant at which the hopping plan is first executed on board the satellite, denoted $t\_0$, is provided to the ground segment by the satellite operator with a system dependent inaccuracy. To guarantee interoperability with any beam hopping satellite, in a preferred embodiment, a SoHF time estimator is proposed to correct the error between the actual and the estimated SoHF. The estimated SoHF is calculated by deducting the estimated uplink time from the provided $t\_0$. The same reasoning holds for the estimation of SOHF(n,k), which is an offset of SOHF(n) with multiples of the hopping period, which is calculated by deducting the estimated uplink time from the provided SOIP(n,k), which is offset of SOIP(n) with multiples of the hopping period. The CC is connected to terminals feeding back observed illumination transition measurements. The CC computes and distributes all the necessary timing values to the gateway transmitter.

In certain embodiments the synchronization between the gateway transmitter and the beam hopping satellite occurs in two steps: a coarse synchronization and consecutively a fine synchronization. The coarse synch is foreseen in the case where the initial time error is too large for the closed loop to reach a steady state by only adjusting the symbol rate. To avoid loop instability, some symbols can be initially dropped before entering the fine synchronization process described herein. In other embodiments synchronization is immediately obtained by performing only the fine step. Only having a fine synchronization step may indeed be sufficient (see the simulation results and explanation below).

The synchronization is meant to guarantee that after the illumination of a contour the data sent to terminals in that contour or to terminals illuminated subsequently is not corrupted. A coarse synchronization can be achieved by dropping symbols in the modulator to get the frame boundaries in time right at once. The switching time instant can be estimated by a terminal in the illuminated beam as it is the time instant when the power of the signal received from the satellite drops. The fine synchronization adapts the transmit symbol rate to synchronize to the beam hopping satellite and also to maintain the synchronization (e.g. to track its movement to track clock drifts, etc.). In each terminal the switching time instant measurement has the carrier symbol time as the smallest granularity. For example, for 500 Mbaud this is 2 ns, which is sufficiently small in terms of a beam switching duration of around 200 ns. The relative location of the switching time inside the frame transmitted by the modulator is passed from the terminal to the central controller via an established link. At the very beginning of operation this can be done via a dedicated terrestrial link between the reference terminal and the central controller, and during steady state operation via any available link.

Two possible mechanisms via which the central controller can synchronize the transmission of the transmitter to the beam hopping satellite in the forward link are:
(1) by controlling the symbol rate of that transmitter;
(2) by passing a required Start of Hopping Frame (SoHF) time instant to that transmitter (and others) which controls the symbol rate based upon that. The SoHF time instant is estimated by estimating $t\_0$ (or, equivalently, SoHP(n,k)) and the delay between the transmitter and the satellite.
Approach (1) is sufficient to synchronize a single transmitter. Approach (2) is advantageous in that it facilitates the organization of return link beam hopping and seamless switching from one transmitter to another.

As already mentioned, the relative location of the switching time instant inside the transmitted frame from the modulator is passed from the terminal to the central controller. This information allows the CC to instruct the gateway modulator to adjust its symbol rate such that switching time instants fall on the desired location (e.g. the centre of the guard time).

The symbol rate is realized in the modulator by a numerically controlled oscillator (NCO), which increments a counter at every clock event. At the time instant when the binary counter reaches the maximum representable value in a finite bit representation, a symbol valid event occurs, which means a symbol is added into the tapped delay line of the pulse-shaping filter in the modulator. For example, for a symbol rate of 100 Mbaud and a clock rate of 300 MHz, every three clock cycles, a symbol valid event should happen. For a maximum counter value of $244$, the accumulator value with which the counter increases at every clock cycle consequently equals to the closest integer to $244/3$.

The instruction from the central controller to the modulator in the transmitter device can occur in multiple ways. Either the controller passes the deviation (or any function of it) between the actual and desired switching time instant and the modulator has an internal control loop (e.g. Phase lock loop, PLL, or Delay Lock Loop, DLL) controlling the NCO realizing the symbol rate, to bring the deviation close to zero. The input of this internal control loop is the timing or phase error or any function thereof reported by the terminals to the CC. The controller can either directly increase or decrease the accumulator value of the NCO (and thus the symbol rate) via a software configuration of this value. The requirement for both is that this controller have directly or indirectly (e.g. through the modulator processor) access to the registers on the modulator to configure the deviation or the symbol rate accumulator value.

A numerical example is now provided to illustrate approach (1), i.e. synchronization by controlling the transmit symbol rate. For instance, an on-board the spacecraft clock with accuracy 1e-7 (i.e. 0.1 ppm) translates into a clock drift of 1 psec every 10 seconds. It is therefore expected to adapt the gateway transmitter symbol rate by 1e-7 to track the satellite clock drift. The gateway transmitter clock, however, is also drifting by e.g. +/−5e-9, thus a differential clock error of +/−1 μsec every 200 seconds is also present but is not expected to have a detrimental effect on the system.

Figure 4:
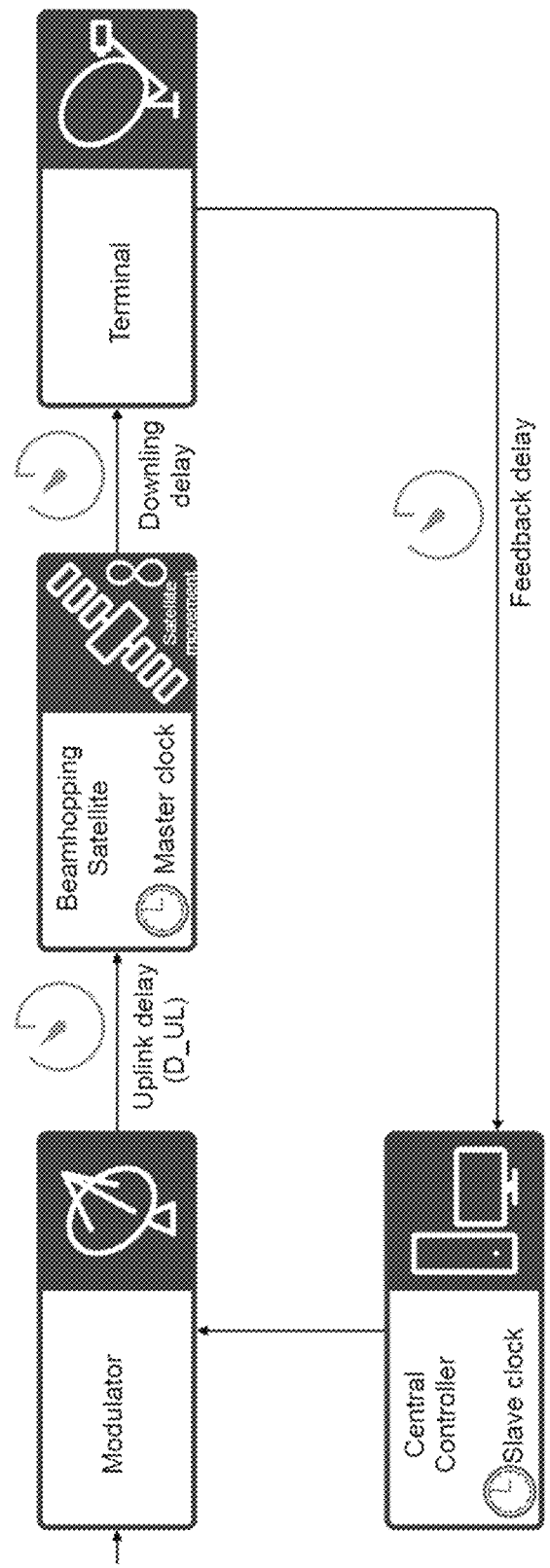
FIG. 4 illustrates a block diagram of the distributed time correction loop, implemented with realistic delays between the central controller, the modulator, the beam hopping satellite and the reference terminal.
Figure 5:
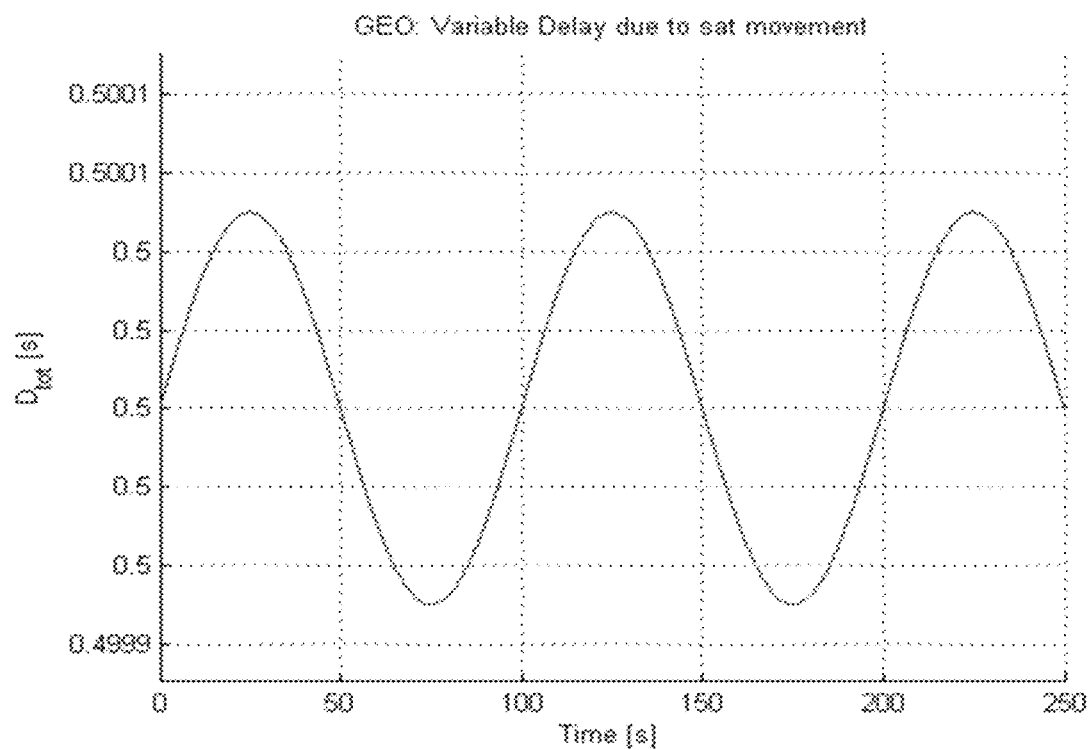
FIG. 5 illustrates the model used to simulate the satellite movement. The effect of the movement is considered by adding a sinusoidal delay variation as shown in this figure.
Figure 6:
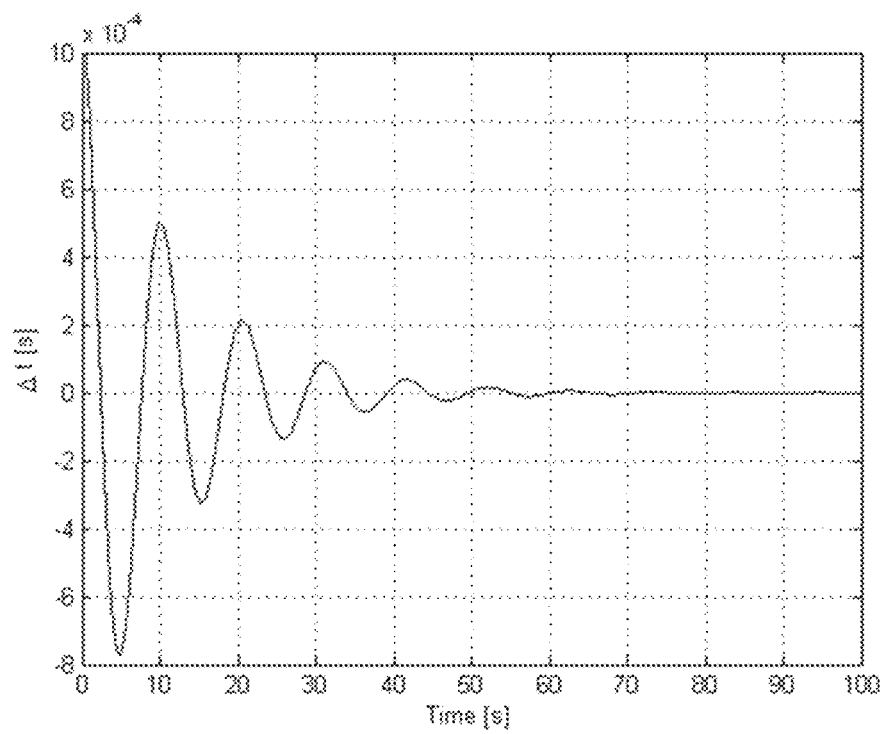
FIG. 6 illustrates the time error response to an initial worst case disturbance of 1e-3 seconds, including the variable delay due to the satellite movement.
Figure 7:
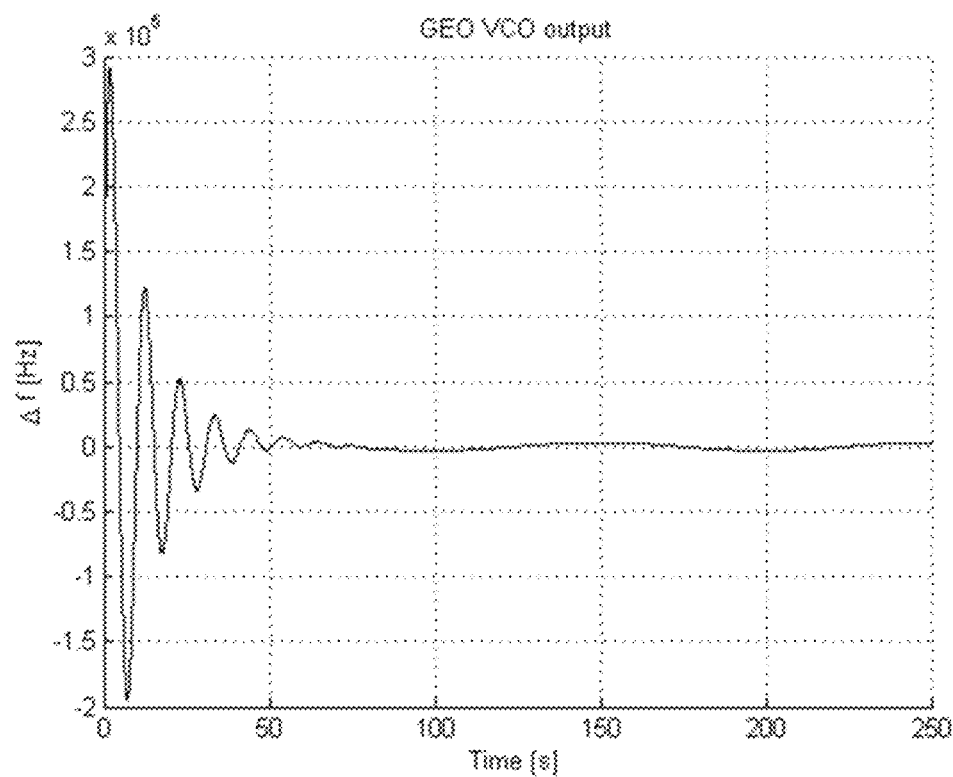
FIG. 7 illustrates the frequency error correction, or in other words, the required symbol rate adaptations over time to reach in a steady state, tracking the satellite movement.
Figure 8:
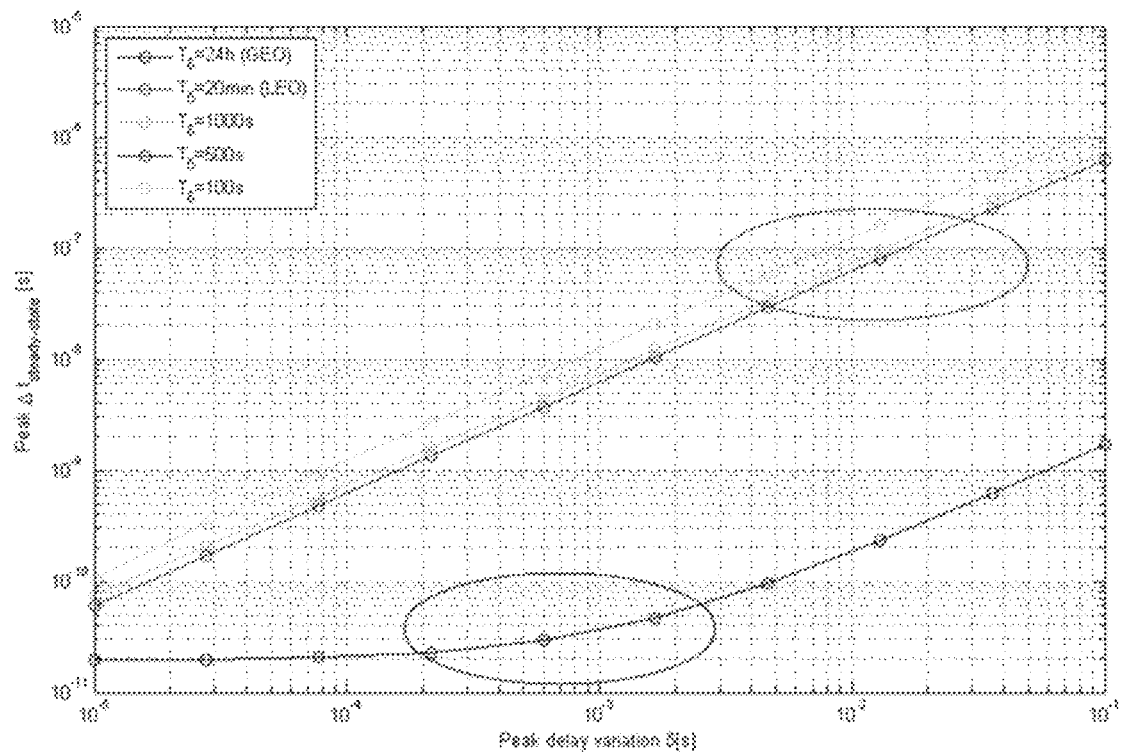
FIG. 8 illustrates the peak steady state error of the time correction loop, versus the peak delay variation of GEO and non-GEO satellite systems.

For the method according to approach (1) it is sufficient that the controller estimates the switching time instant at the receiver and compares it with the desired switching time instant, as an input to a symbol rate adjustment. In addition and more specifically required for approach (2) elaborated below, a controller can estimate the SoHP(n,k) or t_0 based on a distributed time correction loop, as shown in FIG. 4. System level simulations are carried out to exhibit the stability of the proposed distributed time correction loop. The results are depicted in FIGS. 6, 7 and 8. By way of example, the satellite movement is modelled through a sinusoidal delay variation as shown in FIG. 5. An initial time disturbance of 1 ms (which is reasonable, giving the accuracy of 100 ns of GPS time, the satellite moving in its station keeping box, etc.) is fed into the loop and the settling time is calculated to be less than 1 minute, as depicted in FIGS. 6 and 7. The symbol rate variation to achieve this time response is shown in FIG. 7, wherein a maximum offset of 300 kbaud is noted. Indeed, an offset of 300 kbaud means that every second, 300000 symbols extra (to compensate for a switching time instant that falls too early) or less (to compensate for a switching time instant that falls too late) are transmitted. Suppose that the switching time instant fell wrong half a superframe, which is about 300000 symbols, then this error is compensated by this adjustment after one second. Taking into account all clock drifts and the control loop mechanism, one minute suffices to track the beam hopping satellite. It is common knowledge to those skilled in the art that a demodulator operating at symbol rates around 36 Mbaud or greater can remain in lock with symbol rate offsets of +/−15% of the nominal symbol rate. Since 300 kbaud is merely 0.06% of a 500 Mbaud signal, any receiver tracking such symbol rate variations can operate normally. It is thus concluded that a symbol rate variable modulator can synchronize to the beam hopping satellite and keep track during normal operations. Finally, the maximum steady state error on the actual SoHP(n,k), for various satellite movement models (defined by the period T_b of the peak to peak variation) is given in FIG. 8. Therein, it is clear that the steady state error on the SoHP(n,k) is less than 1 ns for Geostationary Earth Orbit (GEO) satellites and less than 1 μs for low Earth orbit (LEO) satellites. Since 1 μs corresponds to 500 symbols at 500 Mbaud symbol rate, such values of the steady state error should be avoided. This can be achieved by further optimizing the parameters of the synchronization loop and/or by including satellite ephemeris data. In this example no consideration of the ephemeris or the exact GPS position of the LEO satellite is considered and no optimization over the loop parameters has been performed. Therefore the results shown rather represent a worst case and are merely indicative.

Approach (1) only requires a reference terminal per gateway in only one of the beams to align the transmitter with a beam hopping satellite. However, if the traffic has to be switched to a redundant transmitter, that redundant transmitter then has to align again with the beam hopping satellite, as the processing time of the data before it gets transmitted will suddenly change. Hence, the switching does not occur seamlessly.

Approach (2) comprises estimating the actual SoHF time instant, which requires estimating t_0 and the delay between the transmitter and the beam hopping satellite. When considering return link beam hopping and seamless switching to redundant modulators, approach (2) is therefore more useful in that context than method 1, as further explained below.

Based on the observed versus desired switching time instant, known by the controller, the controller can update the estimated SoHF time instant for the modulator (which depends on the start of hop time at the satellite and the delay between the modulator and the satellite), which it passes to the modulator processor. That modulator processor consequently adjusts the symbol rate until the start of hop times are aligned with the required start of hop times. For example, the time instant passed to the modulator processor can be the required SoHF(n) time instant for the first symbol of the $n^{th}$ hopping plan, or SoHF(n,k) for the first symbol of the $k^{th}$ repetition of the $n^{th}$ hopping plan, or SoHF(n,k)+m T_s for the mth symbol of the $k^{th}$ repetition of the $n^{th}$ hopping plan where T_s is the symbol time. Alternatively, it can be the time instant of another symbol of the frame. Which symbol is taken corresponding to the passed transmit time, merely depends on the convention adopted in the implementation. The hopping framer signals via metadata along with the frame which symbol is that particular symbol (e.g. the first symbol of a hopping frame).

Instead of the SoHF time instant, the controller can pass any metric equivalent to the SoHF time instant (i.e., from which the SoHF time instant for the modulator can be derived), e.g. the satellite position and the hopping time on the satellite. This SoHF time instant can be signalled to the modulator in a variety of ways, either via the hopping framer (which can include it for example in the NCR placeholder, or in metadata traveling together with the data), or directly to the pulse shape filter for example.

Now the estimation of the SoHF time instant in the central controller for approach 2 is discussed. This requires the estimation of SoHP(n,k) and the delay between the transmitter and the beam hopping satellite. The latter requires knowing the position of the gateway transmitter and tracking the position of the satellite. At least three gateways with a common accurate time and position reference (e.g. GPS time and coordinates), each connected to a reference terminal that feeds back beam switching information are required to accurately estimate the satellite position. The exact time and position of the terminals, or the delay between the gateways, the satellite and the terminals, are not required for estimating the satellite position. To estimate SoHP(n,k), a fourth satellite is needed. An algorithm to estimate the satellite position and SoHP(n,k) is presented in the following, based for instance on a Cartesian coordinate system, as shown in FIG. 10. For simplicity, SoHP(n,k) is replaced by t_0, which corresponds to SoHP(0,0).

Step 1: Introduction & Synchronization of Gateway GW 1:

The unknown satellite position and SoHP start time are denoted by the set of coordinates (X_sat, Y_sat, Z_sat) and t_0, respectively. Let t_0_est_0 and (X_sat, Y_sat, Z_sat)_est_0 be the SoHP start time and satellite position estimate, respectively, provided by the satellite operator. The central controller provides the first operational modulators located in GW 1, with t_0_est_0, expressed in a common on ground time reference (e.g. GPS time) and the satellite position estimate (X_sat, Y_sat, Z_sat)_est_0. The modulator starts transmitting its first frame at $$t\_1\_est\_0 = t\_0\_est\_0 - LightSpeed * d(SAT\text{-}GW\_1),$$

where $d(SAT\text{-}GW\_i) = SQRT\ ((X\_i - X\_sat)^2 + (Y\_i - Y\_sat)^2 + (Z\_i - Z\_sat)^2)$ is the Euclidean distance between the satellite and the $i^{th}$ gateway, located at the known position (X_i, Y_i, Z_i), SQRT is the square root operation and LightSpeed=299792458 m/s or the applicable propagation speed of the waveform. After the transmission of the first frame, the fine synchronization loop starts adjusting the symbol rate to correct the timing errors it estimates. At the steady state of the closed loop (see above, this is achieved after an order of magnitude of one minute), the modulator has a new estimation of the next SoHP start time instant (i.e. t_1_est_1) and of the satellite SoHP time t_0_est_1. This time is sufficient to achieve close to zero timing error for GW 1. However, this time cannot be used to predict the SoHF time instant for an additional gateway, as the accurate position of the satellite (only the first estimation (X_sat, Y_sat, Z_sat)_est_0 is available) is still unknown.

Step 2: Introduction & Synchronization of Gateway GW 2

The CC provides the modulator of GW 2 with t_0_est_1 and (X_sat, Y_sat, Z_sat)_est_0. Based on the known local position of GW 2, the local modulator starts transmitting its first frame at $$t\_2\_est\_0 = t\_0\_est\_1 - LightSpeed * d(SAT\text{-}GW\_2).$$

As the satellite position estimate (X_sat, Y_sat, Z_sat)_est_0 was not yet accurate, a synchronization loop was needed to align the transmission of GW2w with the beam hopping satellite. A variation of the previous equation where t_0_est_0 is used instead of t_0_est_1 is also possible. After the respective synchronization loop reaches its steady state, the central controller can solve the following set of equations to deduce a new estimate of the satellite time and satellite position:

$$t\_1\_est\_1 - t\_0\_est\_2 = (d(SAT\text{-}GW\_1)) * LightSpeed$$

$$t\_2\_est\_0 - t\_0\_est\_2 = (d(SAT\text{-}GW\_2)) * LightSpeed$$

from which new, more accurate estimates for two of the four unknown variables can be made. For instance, in FIG. 10A, step 2 shows a very small solution error for the variables t_0 and X_sat.

Step 3: Introduction & Synchronization of Gateway GW 3

As per the procedure followed in step 2, the CC can now calculate three out of the four unknown variables more accurately by solving $$t\_1\_est\_1 - t\_0\_est\_3 = (d(SAT\text{-}GW\_1)) * LightSpeed$$

$$t\_1\_est\_1 - t\_0\_est\_3 = (d(SAT\text{-}GW\_2)) * LightSpeed$$

$$t\_1\_est\_0 - t\_0\_est\_4 = (d(SAT\text{-}GW\_3)) * LightSpeed$$

Step 4: Introduction & Synchronization of Gateway GW 4

As per the procedure followed in step 3, the CC can now accurately calculate four out of the four unknown variables solving $$t\_1\_est\_1 - t\_0\_est\_5 = (d(SAT\text{-}GW\_1)) * LightSpeed$$

$$t\_2\_est\_1 - t\_0\_est\_5 = (d(SAT\text{-}GW\_2)) * LightSpeed$$

$$t\_3\_est\_1 - t\_0\_est\_5 = (d(SAT\text{-}GW\_3)) * LightSpeed$$

$$t\_4\_est\_1 - t\_0\_est\_5 = (d(SAT\text{-}GW\_4)) * LightSpeed$$

Figure 9:
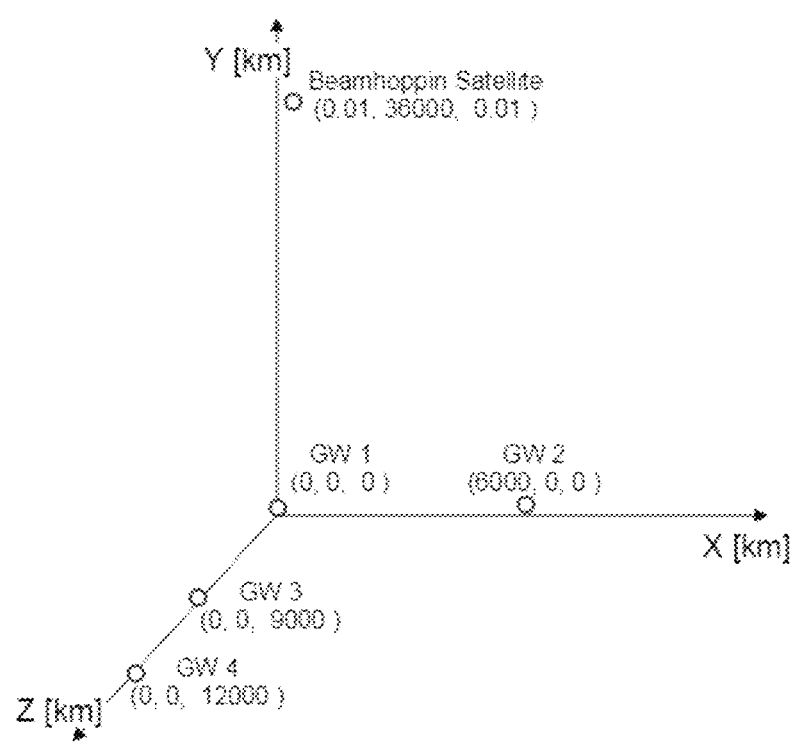
FIG. 9 illustrates a three-dimensional Cartesian coordinate system with satellite and gateway positions set as an example.
Figure 11:
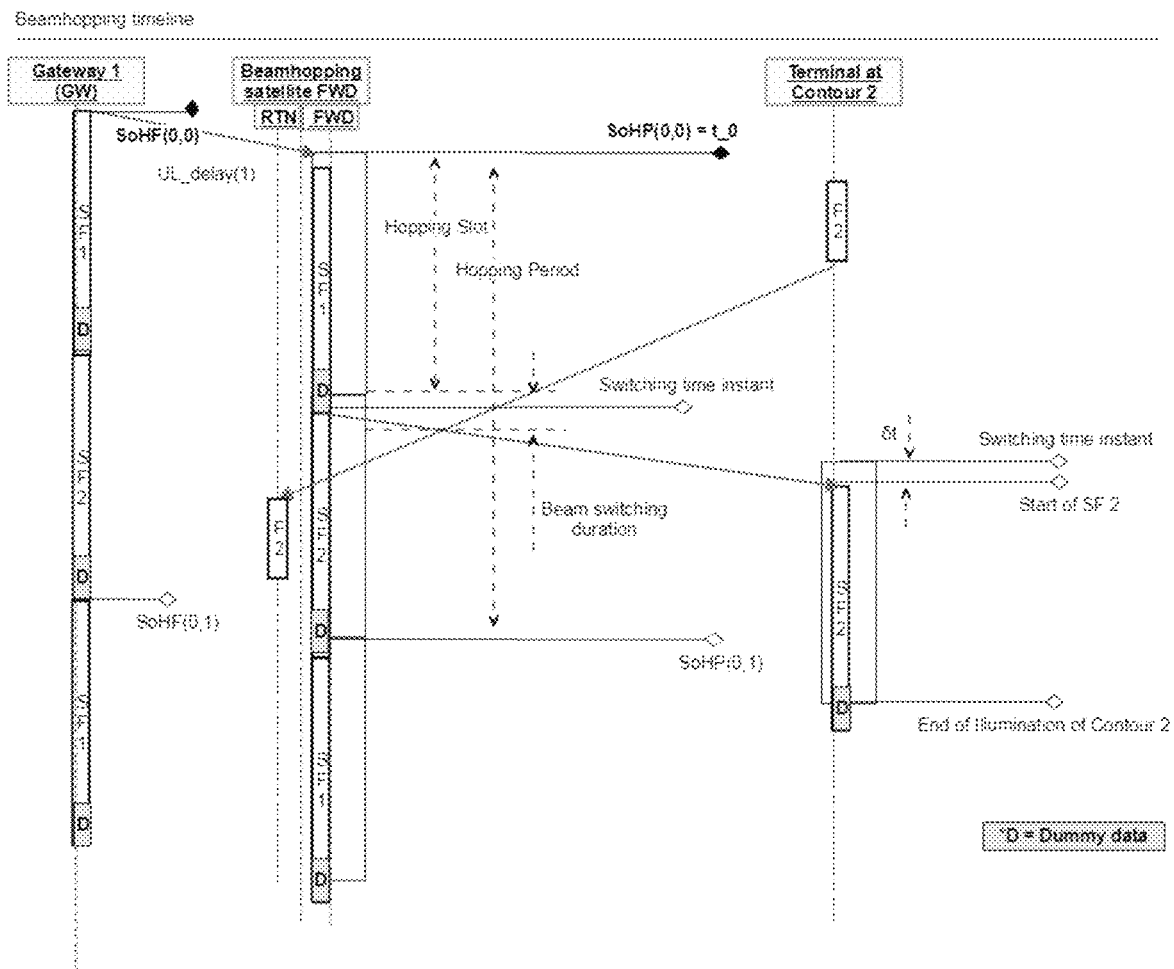
FIG. 11 illustrates a beam hopping timeline diagram between the gateway, the beam hopping satellite and a terminal.
Figure 12:
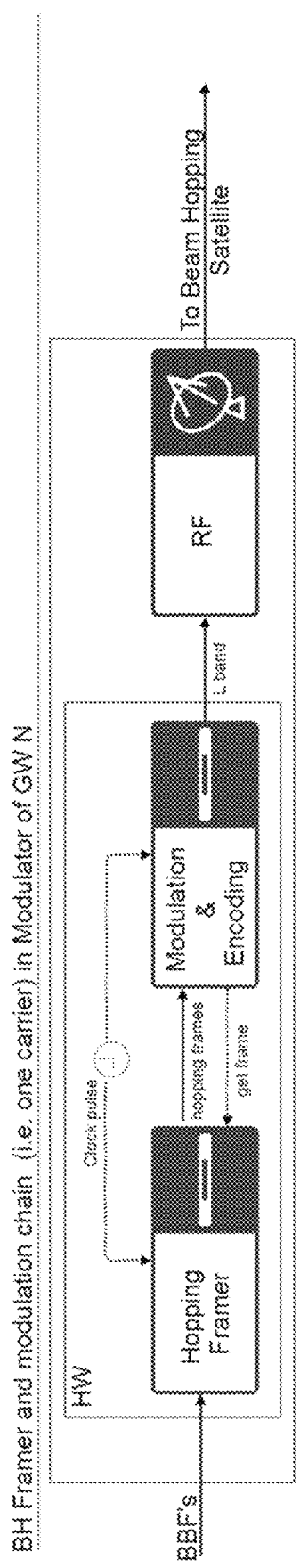
FIG. 12 illustrates a block diagram including the hopping framer and modulation and encoding means in hardware, connected to the RF part.

A simulation of the algorithm is given in FIG. 10, in a Cartesian coordinate system as depicted in FIG. 9. This system of four non-linear equations with four unknown variables can be solved for instance by any commercial off-the-shelf non-linear optimization solver. The one used in the present example is based on the generalized reduced gradient algorithm (GRG). In case more than four GWs are available, the four most reliable gateway-terminal pairs will be chosen, with criteria to be determined on a per specific application basis.

The skilled person readily understands that many variations of this algorithm can be envisaged without departing from the scope of the present invention. For example, all gateways can start transmitting in parallel using t_0_est_0 and (X_sat, Y_sat, Z_sat)_est_0 and then all correct their estimated SoHF time instant based on solving the set of equations.

In order to maintain the synchronization between the modulator and the beam hopping satellite, the dummy data insertion needs to be controlled and decided by the hopping framer and not by physical layer signalling (which operates just before the pulse shaper or transmit filter) as in DVB-S2 or DVB-S2X. More specifically, the hopping framer needs to know the order and time duration of the frames transmitted from the modulator, as it has to make sure that frames for a particular contour arrive at the satellite at the moment that contour is illuminated. This can be realized by including the hopping framer in the modulator, such that it can be subject to the backpressure from the transmit filter, such that there is always a FEC frame ready at the time the transmit filter needs it (to achieve a required symbol rate).

Two methods have been proposed for synchronizing a transmitter with a beam hopping satellite. Approach 2, however, offers the advantage that it allows seamlessly switching to a redundant modulator. The controller can, in case a seamless switch from traffic to a redundant or new gateway transmitter in the system is required, signal the SoHF time instant to the redundant gateway transmitter as well. This SoHF time instant may be slightly different per transmitter as the delay from each transmitter to the satellite is different. As the controller knows the satellite position via approach 2, it can compute the uplink delay for any transmitter with known position. By subtracting that from t_0, which is also known by the controller, it can predict the SoHF time instant for any transmitter with known position.

The invention also concerns return link beam hopping. Given that the central controller estimates the SoHP and thus can organize such that the terminal transmitters transmit in a similar way during the correct time period during which their contour is illuminated, the NCR slaving from the terminals must be such that this synchronization is maintained. Return link beam hopping is typically considered in combination with forward beam hopping since the synchronization to the beam hopping satellite is driven by the forward beam hopping link.

Over the return link burst communication is applied. Synchronizing the terminal transmitters by directly applying approaches 1 or 2 above is complicated for return link beam hopping as the multicarrier demodulator is only listening to a certain burst transmission from a terminal for a small period of time. As such, it can miss the switching time instant. Therefore, it is of interest to have a method to predict the switching time instant at the controller based on the forward link synchronization. The return link is in synch only after the forward link is synched.

In order to achieve this, the following return link beam hopping system is considered. The satellite is assumed to have a common hopper for the forward and the return link. Hence, when a contour is illuminated in the forward link, it is also illuminated at the same time for the return link. Obviously, the forward and return carriers are orthogonal in frequency.

A gateway transmitter transmits a packet for contour 1 at SoHF(n,k). It arrives at the satellite at SoHF(n,k)+UL_Delay, where UL_Delay is the uplink delay from the gateway transmitter to the satellite. A terminal in contour 1 transmits at t_t such that it also arrives at the satellite at SoHF(n,k)+UL_Delay. The terminal packet then arrives at the hub at SoHF(n,k)+2*UL_Delay.

To synchronise the return transmission, the symbol rate and the start of transmit time t_t of the terminals are adjusted by the terminal based on signalling through the forward link from the hub to the terminals. The hub signals a new symbol rate and transmit time t_t in order to make sure that for example terminals transmitting in the same frequency are orthogonal in time and that they transmit in an aligned way with the beam hopping satellite. In general, the hub makes sure that the terminal signals arrive at the hub receiver in the return link at the time the hub expects those signals. Note that after logging in into the system, the terminal has a time accuracy of more or less 3 ms. The remaining synchronization is thus performed by comparing the signal's actual arrival time at the hub with respect to the desired arrival time. The exact uplink delay of each terminal, which depends on the position of each and every terminal, is not calculated. Only the per terminal delta correction to align the signal to the expected time of arrival is required. For this, a per terminal pseudo random binary sequence (PRBS) can be used.

In beam hopping systems the terminal signal needs to be relayed by the beam hopping satellite during the time period in which the terminal's beam is illuminated. The illumination of a beam in the forward and return link is assumed identical, which is a reasonable assumption. Thus, the start time of illumination period k in the $n^{th}$ hopping plan is SoHF(n,k)+UL_delay(N) (with N denoting the $N^{th}$ gateway), which are both known due to the forward link synchronization, as described above.

Thus, an adjustment of the state of the art systems to make return link beam hopping possible is the following. The hub must signal start of transmit times t_t through the forward link to the terminals in order to align the start of the terminal's signal when received at the hub at SOHF(n,k)+2*UL_delay(N).

Via NCR slaving all terminals are synched with the hub timing. As a consequence, it can instruct each of the terminals to transmit at their corresponding t_t (each terminal has a different t_t as their position is different) such that their packets arrive at the satellite at SoHF(n,k)+UL_Delay.

If the traffic is routed through a new or redundant gateway transmitter, it is of interest to maintain the current NCR reference, which is signalled through the forward link from the gateway transmitter to the terminals, and based on which the terminals realize the symbol rate and transmit time for the return link transmissions. In the present invention the gateway modulator restamps the NCR placeholders in the frames such that it contains the NCR value that the modulator has, at the time instant when the waveform (more specifically, the start or a particular offset after the start, which is an implementation detail) arrives at the satellite, which is its current NCR value incremented with a value proportional to its uplink delay from it to the satellite. The latter is known in approach 2, making the above possible in approach 2. Of course, any variation of that which depends on the convention of implementation is part of the invention. For example any reference can be used for this, also other references than the NCR.

Hence, modulators with another position would restamp the NCR placeholders on a different moment in time but in the same way with quasi the same NCR value, synchronous with the satellite, which is stable and tracked by the single (per satellite hopper) controller, regardless of a switch to a redundant gateway transmitter. Thus, at the receiver the perceived NCR reference is also stable. This is important in order to avoid any change in the transmit times of the return link transmitters, so that they remain synchronized with the beam hopping satellite.

The above-described synchronization algorithms require reference terminals to only measure beam transition incidents (relative time) and have no requirements on the position of the reference terminals. Nevertheless, at least four gateways are required in order for the satellite position and the SoHP time to be accurately estimated. This is required when wanting to direct the traffic from one gateway to another. If having four gateways is not possible, other solutions can be envisaged. A summary of the options to synchronize the ground segment to the beam hopping

|        |     | GWs  | Ref. Terminals |            |                    |
|--------|-----|------|----------------|------------|--------------------|
|        |     | Num. | Num.           | Location   | Measurement        |
| option | I   | 1    | 1              | Collocated | Delay + Transition |
|        |     |      | 2              | Remote     |                    |
|        | II  | 4    | 4              | Remote     | Transition         |
|        | III | 1    | 1              | Collocated | Delay + Transition |
|        |     | 2    | 2              | Remote     | Transition         |
|        | IV  | 1    | 1              | Remote     | Transition         | satellite is provided in the table above. Different assumptions on the number and location of gateways and reference terminals are made. Also the measurement capabilities of the reference terminals are different. Thanks to the present invention all the options in the table work with a beam hopping satellite. Option II refers to the algorithm as detailed in approach 2 of the present invention. Option IV assumes that the accurate satellite position is provided by the satellite operator, so only one terminal aligning the illumination transitions (referring to the switching time instants observed at the terminal receivers) is required to accurately estimate the timing error on SoHF(n,k) to align with the beam hopping satellite. Option I relies on a single gateway with one collocated reference terminal that accurately measures the gateway—satellite uplink delay and two remote reference terminals only measuring transitions. Finally, option III requires one gateway with a collocated reference terminal measuring the gateway-satellite delay and two more gateways with remote terminals only measuring transitions.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A satellite communication system arranged for consecutively illuminating a plurality of contours on earth and comprising:
    a transmitter device arranged for generating a signal to be transmitted and comprising:
    one or more hopping framers each arranged for receiving a sequence of bits and for organizing said sequence of bits into a hopping frame according to a hopping plan indicating an order in which said plurality of contours is to be illuminated;
    an encoder per hopping framer for mapping said hopping frame to a sequence of digital symbols;
    a modulator per hopping framer arranged for receiving said sequence of digital symbols and for modulating said digital symbols on a waveform at a symbol rate, thereby obtaining a modulated signal to be transmitted, and for initiating transmission of said modulated signal at a time instant equal to a Start of Hopping Frame, SoHF, time instant, said modulator being arranged for indicating to said hopping framer when a next hopping frame is needed, whereby said hopping framer is arranged for inserting dummy data if not sufficient bits are available in said sequence of bits when said next hopping frame is needed;
    a satellite comprising a beam hopping transponder arranged for receiving said modulated signal and for outputting a version of said modulated signal to an illumination circuit arranged in said satellite for steering illumination from one contour to another particular contour of said plurality of contours according to said hopping plan, said illumination of said one contour starting at a switching time instant;
    one or more receiver devices in said particular contour of said plurality of contours to be illuminated and arranged for receiving said outputted version of said modulated signal;
    a central controller having an established communication link with at least one of said receiver devices and arranged for receiving via said established link information on observed illumination transitions, said central controller comprising computation means for computing updated timing information for aligning in time said transmitter device with said beam hopping transponder, based on said information on observed illumination transitions and being in connection with said transmitter device for passing said updated timing information to said transmitter device.

2. The satellite communication system as in claim 1, wherein said computation means of said central controller is arranged for computing an adjusted symbol rate for said transmitter device based on a comparison of said observed illumination transitions with a target switching time instant.

3. The satellite communication system as in claim 1, wherein said computation means of said central controller is arranged for computing an estimate of said SoHF time instant.

4. The satellite communication system as in claim 1, wherein said SoHF time instant is set to a value equal to said switching time instant minus a transmission delay between said transmitter device and said satellite comprising said beam hopping transponder.

5. The satellite communication system as in claim 1, wherein said computation means is arranged for determining an adjusted symbol rate based on said updated timing information.

6. The satellite communication system as in claim 1, wherein said SoHF time instant is expressed in terms of a value of a network clock reference.

7. The satellite communication system as in claim 1, arranged to compare said SoHF time instant with a target value and to adjust said symbol rate based on said comparing.

8. The satellite communication system as in claim 7, wherein said transmitter device is arranged to drop one or more symbols before adjusting said symbol rate.

9. The satellite communication system as in claim 1, comprising:
    at least four transmitter devices with known position and arranged for transmitting to said satellite comprising said beam hopping transponder, the at least four transmitter devices including the transmitter device arranged for generating a signal to be transmitted, and
    at least four receiver devices, each of said receiver devices being connected to a corresponding transmitter device of said at least four transmitter devices and each having a communication link to said central controller, the at least four receiver devices including the one or more receiver devices in said particular contour of said plurality of contours.

10. The satellite communication system as in claim 9, wherein said central controller is arranged for computing a SoHF time instant for each of said at least four transmitter devices.

11. The satellite communication system as in claim 9, comprising an additional transmitter device arranged for receiving a different SoHF time instant determined based on said satellite's position and switching time instant obtained using said at least four transmitter devices.

12. The satellite communication system as in claim 1, arranged for use in transmission over a link from one of said receiver devices over said satellite towards said transmitter device,
    wherein said one receiver device is arranged for symbol rate and transmit time adjustment based on signaling from said transmitter device towards said one receiver device.

13. The satellite communication system as in claim 12, wherein said one receiver device is arranged for realizing said symbol rate and transmit time based on a clock derived from a reference based on signaling from said transmitter device towards said one receiver device, said reference being computed as a time value being a value of said network clock reference incremented with a function of said transmission delay between said transmitter device and said satellite comprising said beam hopping transponder.

14. The satellite communication system as in claim 12, wherein said signaling is based on comparing a receive time of a transmission of said one receiver device with a target receive time.

15. The satellite communication system as in claim 14, wherein said receive time is a receive time of a first symbol of a frame in said transmission and wherein said target receive time is a SoHF time instant incremented with two times said transmission delay between said transmitter device and said satellite comprising said beam hopping transponder.

* * * * *